United States Patent
Shimada

(10) Patent No.: US 9,235,035 B2
(45) Date of Patent: Jan. 12, 2016

(54) ZOOM LENS AND IMAGING APPARATUS

(71) Applicant: FUJIFILM Corporation, Tokyo (JP)

(72) Inventor: Yasutaka Shimada, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 16 days.

(21) Appl. No.: 14/336,387

(22) Filed: Jul. 21, 2014

(65) Prior Publication Data

US 2015/0022902 A1  Jan. 22, 2015

(30) Foreign Application Priority Data

Jul. 19, 2013 (JP) .................................. 2013-150125

(51) Int. Cl.
*G02B 15/17* (2006.01)

(52) U.S. Cl.
CPC ..................................... *G02B 15/17* (2013.01)

(58) Field of Classification Search
CPC ................................ G02B 15/17; G02B 15/14
USPC .................................................. 359/683, 688
See application file for complete search history.

(56) References Cited

U.S. PATENT DOCUMENTS

| 5,757,554 A | 5/1998 | Fukami |
| 5,808,809 A | 9/1998 | Yahagi |
| 5,966,246 A | 10/1999 | Yoshikawa |
| 5,995,296 A * | 11/1999 | Usui ........................ G02B 15/17 359/684 |
| 7,630,145 B2 | 12/2009 | Wakazono et al. |
| 2015/0022901 A1* | 1/2015 | Komatsu .............. G02B 15/173 359/688 |

FOREIGN PATENT DOCUMENTS

| JP | 09-15501 | 1/1997 |
| JP | 10-31157 | 2/1998 |
| JP | 10-62686 | 3/1998 |
| JP | 2004-309761 | 11/2004 |
| JP | 2009-042346 | 2/2009 |

* cited by examiner

*Primary Examiner* — Scott J Sugarman
(74) *Attorney, Agent, or Firm* — Young & Thompson

(57) ABSTRACT

A zoom lens substantially consists of a positive first lens group, a negative second lens group which moves from the object side to the image side while changing magnification from the wide angle end to the telephoto end, a negative third lens group, and a positive fourth lens group having an aperture stop St, wherein the first lens group includes a negative meniscus lens on the most-object side; the second lens group is composed of a negative second-a lens group having at least one aspheric surface and a positive second-b lens group, and the distance therebetween changes while changing magnification; a third lens group moves such that the distance between the third lens group and a fourth lens group at the telephoto end becomes narrower than at the wide angle end; and conditional expression (1) below is satisfied:

$$1.89 < N1a1 \qquad (1).$$

17 Claims, 9 Drawing Sheets

FIG.5
EXAMPLE 1
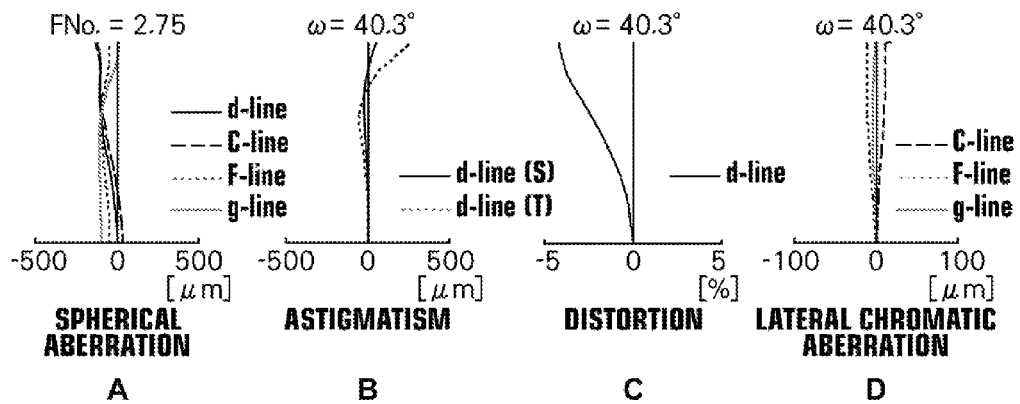
WIDE ANGLE — A: Spherical Aberration, B: Astigmatism, C: Distortion, D: Lateral Chromatic Aberration
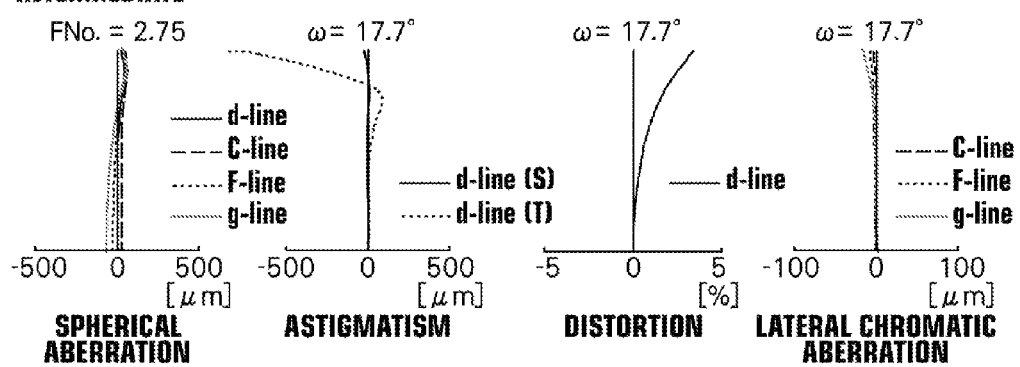
INTERMEDIATE — E: Spherical Aberration, F: Astigmatism, G: Distortion, H: Lateral Chromatic Aberration
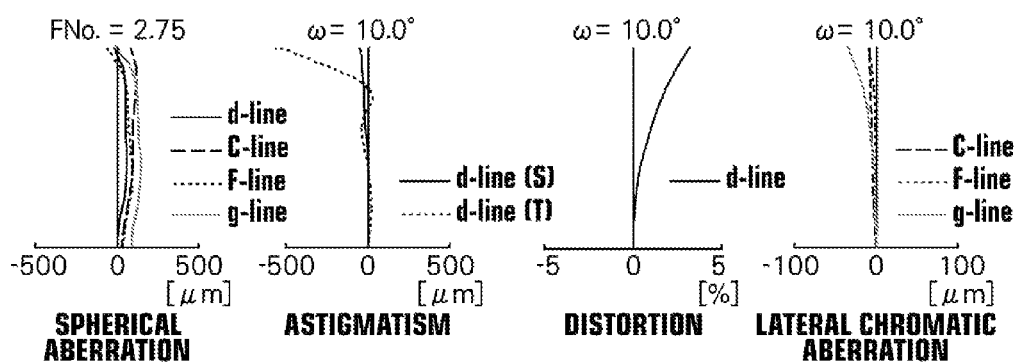
TELEPHOTO — I: Spherical Aberration, J: Astigmatism, K: Distortion, L: Lateral Chromatic Aberration

FIG.6
EXAMPLE 2
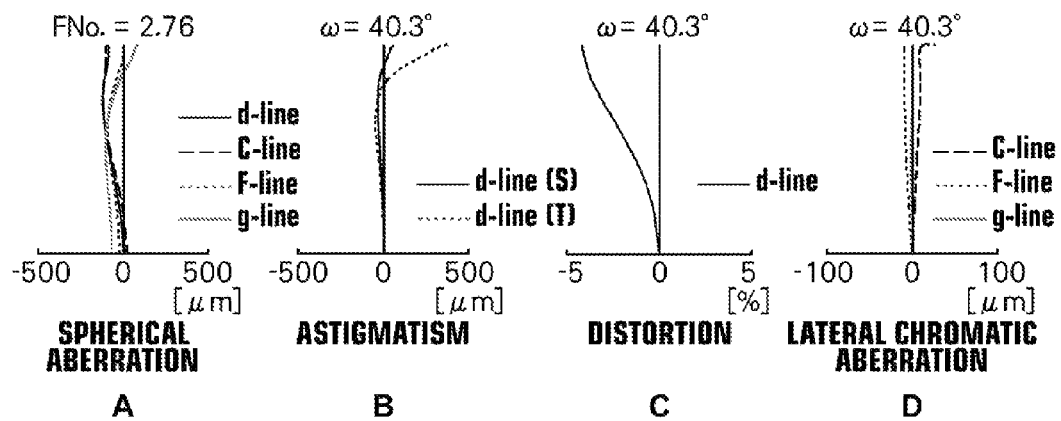
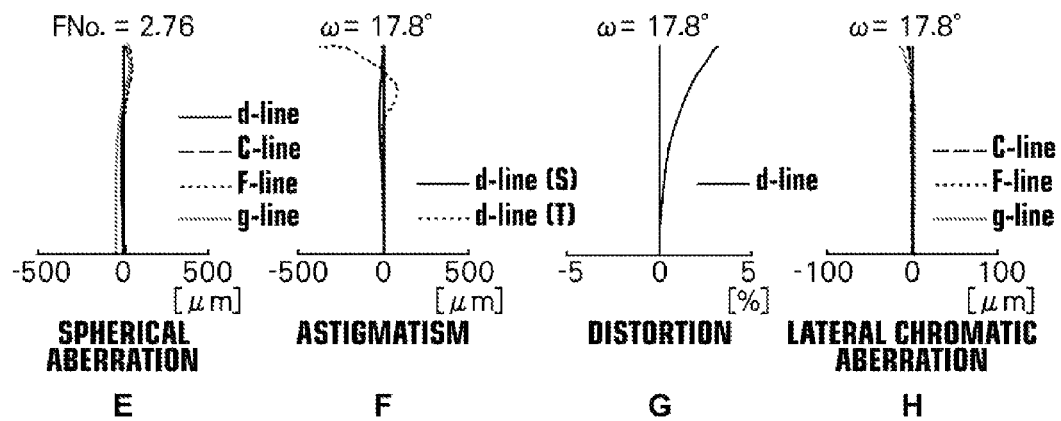
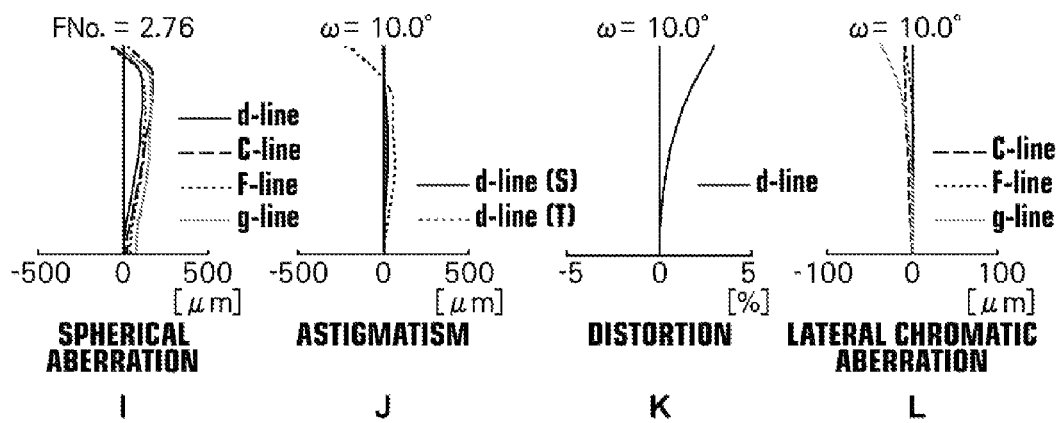

FIG.7
EXAMPLE 3
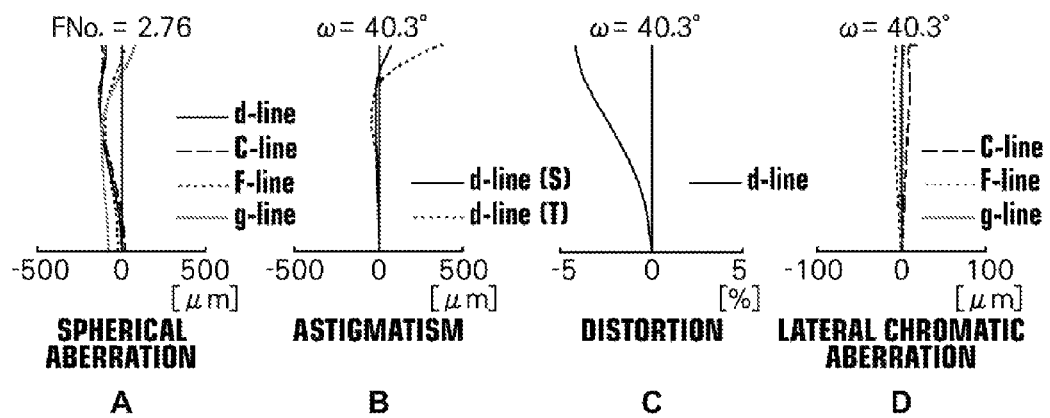
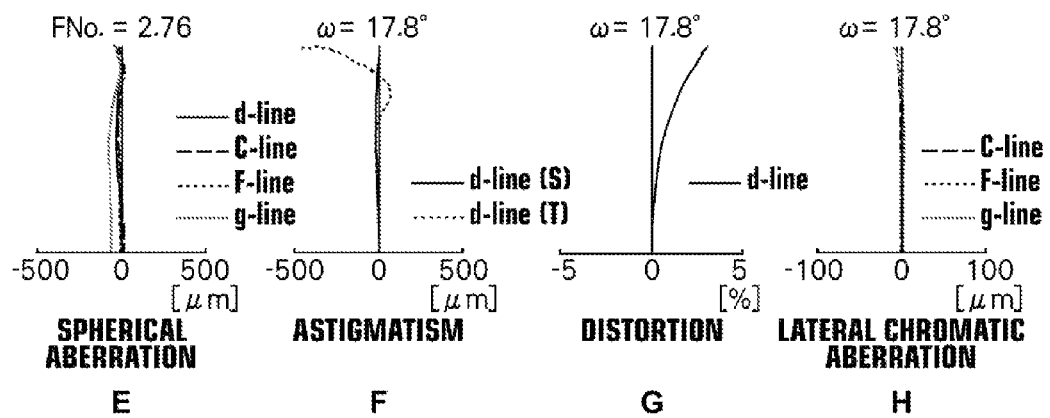
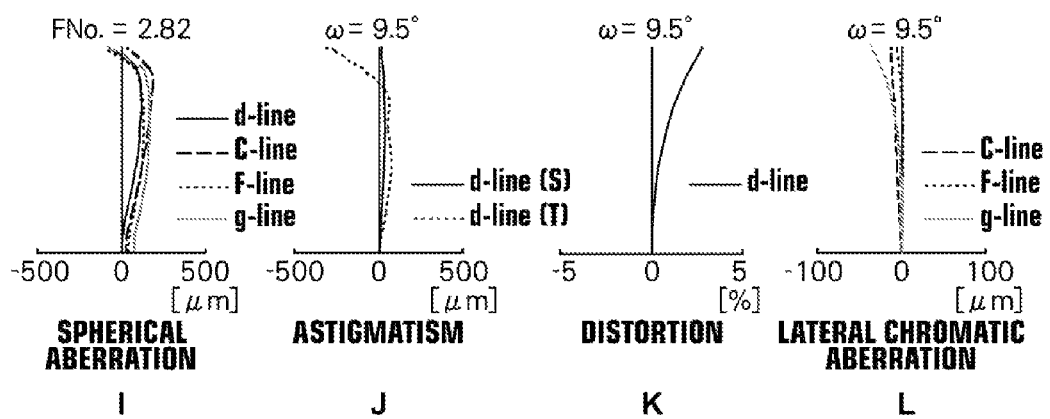

FIG.8
EXAMPLE 4
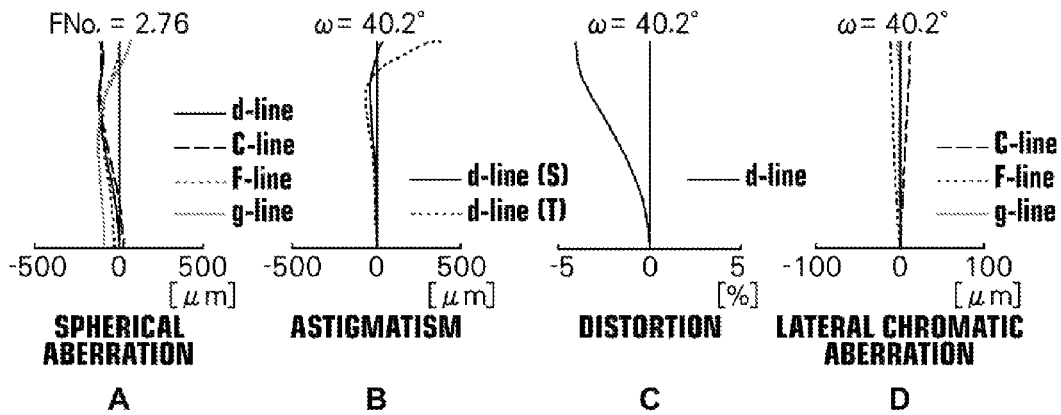
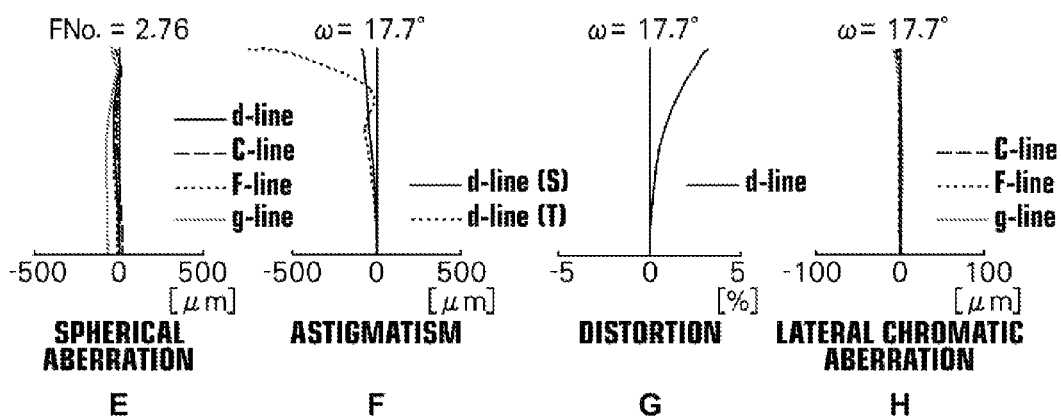
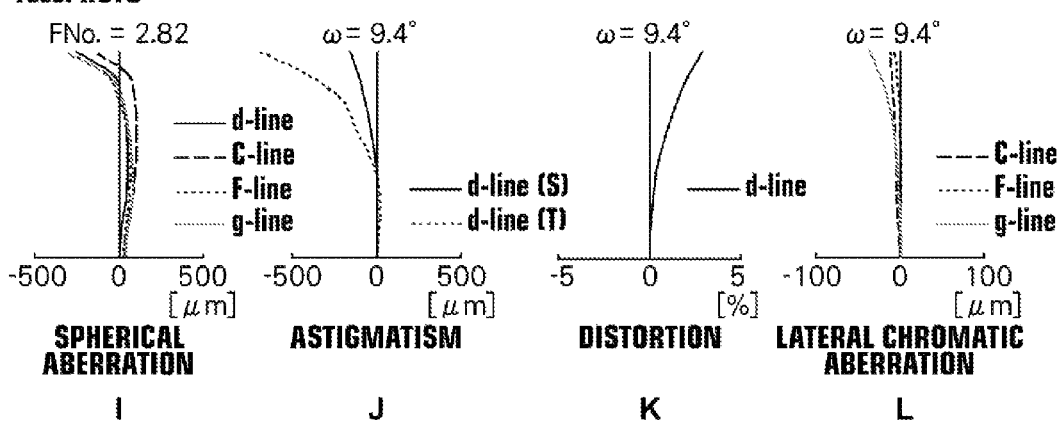

ZOOM LENS AND IMAGING APPARATUS

CROSS-REFERENCE TO RELATED APPLICATIONS

The present application claims priority under 35 U.S.C. §119 to Japanese Patent Application No. 2013-150125, filed Jul. 19, 2013. Each of the above application(s) is hereby expressly incorporated by reference, in its entirety, into the present application.

BACKGROUND OF THE INVENTION

1. Technical Field

The present invention relates to a zoom lens suited for electronic cameras such as a digital camera, a video camera, a broadcasting camera, a movie camera, a surveillance camera, and the like, and to an imaging apparatus including the zoom lens.

2. Description of the Related Art

As broadcasting cameras and movie cameras are easily affected by changes in angle of view by focusing, a zoom lens of a four-group configuration, which corresponds to such cameras, usually applies a focus system in which a first lens group is composed of a first-a lens group having negative refractive power, a first-b lens group having positive refractive power, and a first-c lens group having positive refractive power; and only the first-b lens group is moved. Examples of such zoom lenses include those disclosed in Japanese Unexamined Patent Publication No. 9 (1997)-015501, Japanese Unexamined Patent Publication No. 10 (1998)-062686, and Japanese Unexamined Patent Publication No. 2009-042346, for example.

In such zoom lenses having a first lens group composed of three groups as described above, a zoom lens of a five-group configuration which achieves a higher zoom ratio is proposed in Japanese Unexamined Patent Publication No. 10 (1998)-031157.

Furthermore, cinema cameras in particular require the same or higher performance compared with an imaging lens for a HDTV (high definition television). An example of a zoom lens which meets such a requirement is disclosed in Japanese Unexamined Patent Publication No. 2004-309761, for example.

SUMMARY OF THE INVENTION

There is demand for the zoom lenses as described above to have a higher performance to enhance image quality.

The present invention has been developed in view of the above circumstances. It is an object of the present invention to provide a high-performance zoom lens, in which various aberrations are favorably corrected, and an imaging apparatus including the lens.

A zoom lens of the present invention substantially consists of a first lens group having positive refractive power, which is fixed while changing magnification; a second lens group having negative refractive power, which moves from the object side to the image side while changing magnification from the wide angle end to the telephoto end; a third lens group having negative refractive power, which corrects movement of an image surface while changing magnification; and a fourth lens group, which is fixed while changing magnification, having positive refractive power and an aperture stop in this order from the object side, wherein the first lens group includes a negative meniscus lens on the most-object side;

the second lens group is composed of a second-a lens group having negative refractive power and at least one aspheric surface and a second-b lens group having positive refractive power in this order from the object side, and the distance between the second-a lens group and the second-b lens group is changed while changing magnification; and the third lens group moves such that the distance between the third lens group and the fourth lens group becomes narrower at the telephoto end than at the wide angle end; and conditional expression (1) below is satisfied:

$$1.89 < N1a1 \quad (1)$$ where,

N1a1: the refractive index of a negative meniscus lens on the most-object side in the first lens group.

It is preferable for the zoom lens of the present invention to satisfy conditional expression (2) below:

$$-3.00 < f1a1/f1 < -1.70 \quad (2)$$ where, f1a1: the focal length of the negative meniscus lens on the most-object side in the first lens group,
f1: the focal length of the first lens group.

It is preferable for the first lens group to substantially consist of a first-a lens group having negative refractive power, which is fixed while focusing; a first-b lens group having positive refractive power, which moves while focusing; and a first-c lens group having positive refractive power, which is fixed while focusing, in this order from the object side, and to satisfy conditional expression (3) below:

$$0.05 < fw/f1b < 0.20 \quad (3),$$ where fw: the focal length of the entire system at the wide angle end,
f1b: the focal length of the first-b lens group.

It is preferable for the first-b lens group to be a cemented lens formed by cementing a negative lens and a positive lens together, in which a joint surface has a convex surface toward the object side; and to satisfy conditional expression (4) below:

$$0.05 < \theta gF1bp - \theta gF1bn \quad (4)$$ where,

θgF1bp: the partial dispersion ratio of the g-line and the F-line of the positive lens constituting the cemented lens of the first-b lens group,
θgF1bn: the partial dispersion ratio of the g-line and the F-line of the negative lens constituting the cemented lens of the first-b lens group.

It is preferable for the second-a lens group to substantially consist of a negative meniscus lens with a convex surface toward the object side and a negative lens having a biconcave shape.

In addition, it is preferable for conditional expression (5) below to be satisfied:

$$1.75 N2a \quad (5)$$ where,

N2a: the average refractive index of lenses constituting the second-a lens group.

It is preferable for the second-b lens group to be a cemented lens formed by cementing a positive lens having a biconvex shape and a negative lens together, in this order from the object side; and to satisfy conditional expression (6) below:

$$20.0 < v2bn - v2bp \quad (6)$$ where, v2bn: the Abbe number of the negative lens constituting the cemented lens of the second-b lens group,
v2bp: the Abbe number of the positive lens constituting the cemented lens of the second-b lens group.

It is preferable for the third lens group to be a cemented lens formed by cementing a negative lens and a positive lens together, in this order from the object side; and to satisfy conditional expression (7) below:

$$30.0 < v3n - v3p \quad (7)$$

where,
v3n: the Abbe number of the negative lens constituting the cemented lens of the third lens group,
v3p: the Abbe number of the positive lens constituting the cemented lens of the third lens group.

It is preferable for the second lens group to be positioned at the most-object side at the wide angle end, and to be positioned at the most-image side at the telephoto end.

In addition, it is preferable for the second lens group to satisfy conditional expression (1-1) below:

$$1.90 < N1a1 \quad (1-1)$$

In addition, it is preferable for the second lens group to satisfy conditional expression (2-1) below:

$$-2.80 < f1a1/f1 < -1.75 \quad (2-1)$$

It is preferable for the first lens group to substantially consist of a first-a lens group having negative refractive power, which is fixed while focusing; a first-b lens group having positive refractive power, which moves while focusing; and a first-c lens group having positive refractive power, which is fixed while focusing, in this order from the object side, and to satisfy conditional expression (3-1) below:

$$0.07 < fw/f1b < 0.10 \quad (3-1)$$

It is preferable for the first-b lens group to be a cemented lens formed by cementing a negative lens and a positive lens together, in which a joint surface has a convex surface toward the object side; and to satisfy conditional expression (4-1) below:

$$0.10 < \theta gF1bp - \theta gF1bn \quad (4-1)$$

In addition, it is preferable for the first-b lens group to satisfy conditional expression (5-1) below:

$$1.79 < N2a \quad (5-1)$$

It is preferable for the second-b lens group to be a cemented lens formed by cementing a positive lens having a biconvex shape and a negative lens together, in this order from the object side; and to satisfy conditional expression (6-1) below:

$$30.0 < v2bn - v2bp \quad (6-1)$$

In addition, it is preferable for the third lens group to be a cemented lens formed by cementing a negative lens and a positive lens together, in this order from the object side; and to satisfy conditional expression (7-1) below:

$$40.0 < v3n - v3p \quad (7-1)$$

An imaging apparatus of the present invention includes the zoom lens of the present invention as described above.

Note that the above expression "substantially consists of" intends to include a lens that includes lenses substantially without any refractive power; optical elements other than lenses such as aperture stops, masks, glass covers, and filters; and mechanical components such as lens flanges, lens barrels, imaging elements, and camera shake correction mechanisms; in addition to the lens groups listed above as constituent elements.

The surface shapes and the signs of the refractive powers of the above lens should be considered in paraxial regions if aspheric surfaces are included therein.

The zoom lens of the present invention substantially consists of a first lens group having positive refractive power, which is fixed while changing magnification; a second lens group having negative refractive power, which moves from the object side to the image side while changing magnification from the wide angle end to the telephoto end; a third lens group having negative refractive power, which corrects movement of an image surface while changing magnification; and a fourth lens group, which is fixed while changing magnification, having positive refractive power and an aperture stop, in this order from the object side, the first lens group includes a negative meniscus lens on the most-object side;

the second lens group substantially consists of a second-a lens group having negative refractive power and at least one aspheric surface and a second-b lens group having positive refractive power in this order from the object side, and the distance between the second-a lens group and the second-b lens group is varied while changing magnification;

the third lens group moves such that the distance between the third lens group and a fourth lens group is narrower at the telephoto end than at the wide angle end; and conditional expression (1) is satisfied.

Thereby, a zoom lens having high performance with various aberrations favorably corrected can be provided.

$$1.89 < N1a1 \quad (1)$$

As the imaging apparatus of the present invention include the zoom lens of the present invention, a video image with high quality can be obtained.

BRIEF DESCRIPTION OF THE DRAWINGS

FIG. 5 shows aberration diagrams A through L of the zoom lens according to Example 1 of the present invention.

FIG. 6 shows aberration diagrams A through L of the zoom lens according to Example 2 of the present invention.

FIG. 7 shows aberration diagrams A through L of the zoom lens according to Example 3 of the present invention.

FIG. 8 shows aberration diagrams A through L of the zoom lens according to Example 4 of the present invention.

DESCRIPTION OF THE PREFERRED EMBODIMENTS

Figure 1:
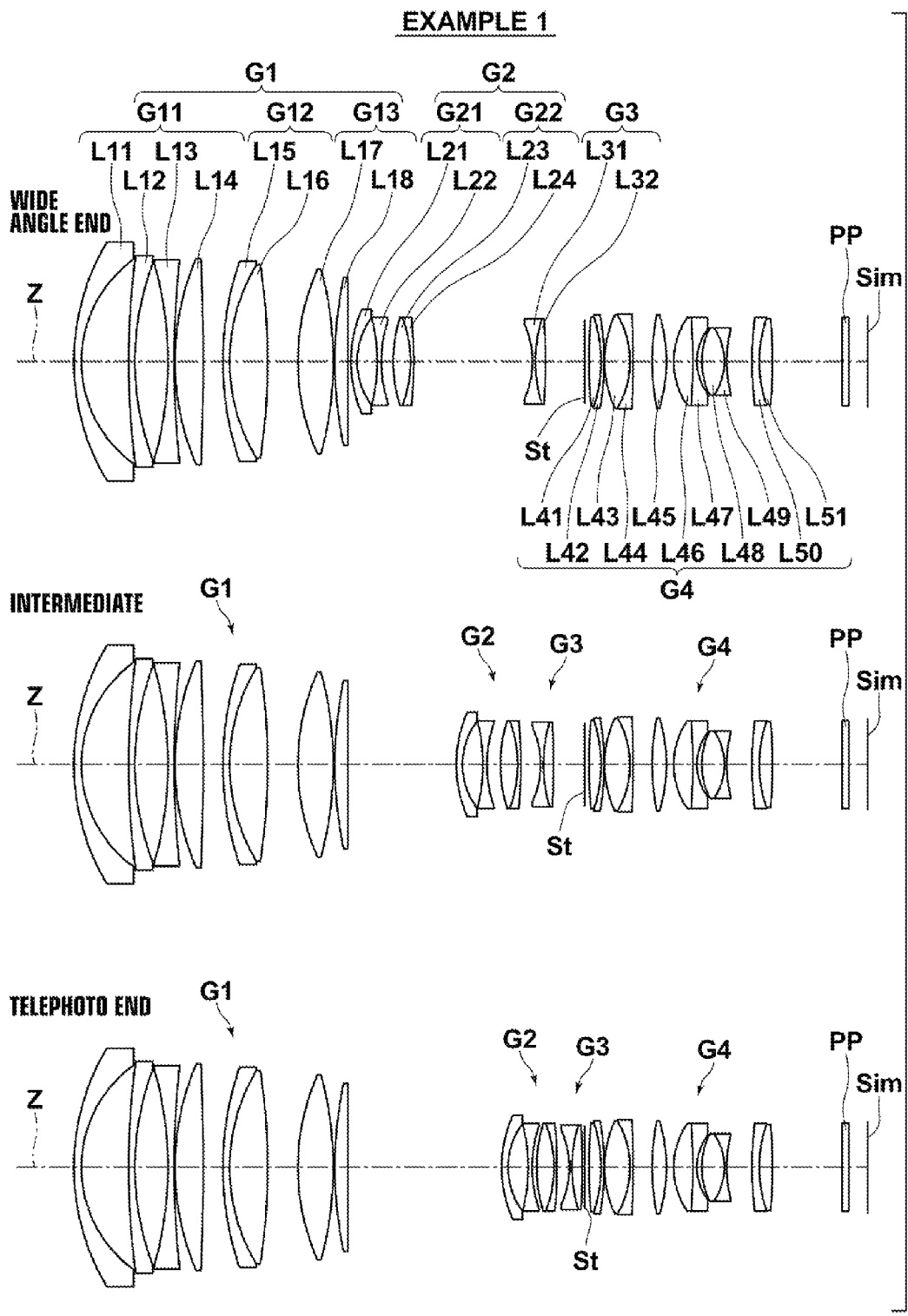
FIG. 1 is a collection of cross-sectional views of a zoom lens according to one embodiment (which is the same as Example 1) of the present invention, illustrating the lens configuration thereof.

Hereinafter, embodiments of the present invention will be described in detail with reference to the accompanying drawings. FIG. 1 is a collection of cross-sectional views of a zoom lens according to one embodiment of the present invention, illustrating the lens configuration thereof. The example of a configuration shown in FIG. 1 is the same as the configuration of the zoom lens of Example 1 to be described later. In FIG. 1, the left side is the object side, and the right side is the image side.

As shown in FIG. 1, this zoom lens substantially consists of a first lens group G1 having positive refractive power, which is fixed while changing magnification; a second lens group having negative refractive power, which moves from the object side to the image side while changing magnification from the wide angle end to the telephoto end; a third lens group G3 having negative refractive power, which corrects movement of an image surface while changing magnification; and a fourth lens group G4, which is fixed while changing magnification, having positive refractive power and an aperture stop St in this order from the object side along the optical axis Z. Note that the aperture stop St does not necessarily represent the size or shape thereof, but represents the position thereof on the optical axis Z.

By configuring the lens in such a manner, a zoom lens having a constant F-number while changing magnification can be realized unless the axial light beam is shielded between the first lens group G1 and the third lens group G3.

When this zoom lens is applied to the imaging apparatus, it is preferable for a cover glass, a prism, various types of filters, such as an infrared cut filter, a low-pass filter, and the like to be provided between the optical system and the image surface Sim according to the configurations of a camera on which the lens is mounted. FIG. 1 illustrates an example in which a plane parallel optical member PP that presumes such filters is provided between the lens system and the image surface Sim.

The first lens group G1 is configured to include a negative meniscus lens L11 on the most-object side and satisfy conditional expression (1) below. By satisfying conditional expression (1), off-axis aberration, and particularly distortion and astigmatism, can be favorably corrected. If conditional expression (1-1) below is satisfied, the lens can have more favorable characteristics.

$$1.89 < N1a1 \tag{1}$$

$$1.90 < N1a1 \tag{1-1}$$

In this case, N1a1 is the refractive index of the negative meniscus lens on the most-object side in the first lens group.

The second lens group G2 includes a second-a lens group G21 having negative refractive power and at least one aspheric surface and a second-b lens group G22 having positive refractive power, in this order from the object side, and is configured such that the distance between the second-a lens group G21 and the second-b lens group G22 is varied while changing magnification. By configuring the lens in such a manner, the zoom lens can obtain high-quality images.

The third lens group G3 is configured to move such that the distance between the third lens group G3 and a fourth lens group G4 is narrower at the telephoto end than at the wide angle end. By configuring the lens in such a manner, the range of motion of the second lens group G2 can be wide at the telephoto end so that the refractive power of the second lens group G2 can be suppressed, and accordingly variation in aberration due to changing magnification can be suppressed.

In the zoom lens of the present embodiments, it is preferable for conditional expression (2) below to be satisfied. By the value of f1a1/f1 not falling below the lower limit defined by conditional expression (2), astigmatism will be advantageously corrected. Moreover, by the value of f1a1/f1 not exceeding the upper limit defined by conditional expression (2), spherical aberration at the telephoto end will be advantageously corrected. Note that by satisfying conditional expression (2-1) below, the zoom lens will be able to have more favorable characteristics.

$$-3.00 < f1a1/f1 < -1.70 \tag{2}$$

$$-2.80 < f1a1/f1 < -1.75 \tag{2-1}$$

where,
f1a1: the focal length of the meniscus lens on the most-object side in the first lens group,
f1: the focal length of the first lens group.

It is preferable for the first lens group G1 to substantially consist of a first-a lens group G11, which is fixed while focusing, having negative refractive power; a first-b lens group G12, which moves while focusing, having positive refractive power; and a first-c lens group G13, which is fixed while focusing, having positive refractive power, in this order from the object side, and preferably satisfy conditional expression (3) below. By configuring the first lens group G1 in such a manner, a change in field angle while focusing can be reduced. By the value of fw/f1b not falling below the lower limit defined by conditional expression (3), the amount of movement of the lens groups while focusing can be prevented from being increased and the distance between the first-a lens group G11 and the first-c lens group G13 can be small. Thereby, the diameter of the first-a lens group G11 can be prevented from enlarging, and miniaturization and a light weight can be realized. Further, by the value of fw/f1b not exceeding the upper limit defined by conditional expression (3), the amount of movement of the lens groups while focusing can be prevented from becoming excessively small, and thereby reducing a variation in aberration due to change in distances.

Note that by satisfying conditional expression (3-1) below, more favorable characteristics can be attained.

$$0.05 < fw/f1b < 0.20 \tag{3}$$

$$0.07 < fw/f1b < 0.10 \tag{3-1}$$

where,
fw: the focal length of the entire system at the wide angle end,
f1b: the focal length of the first-b lens group.

In the case that the first lens group G1 is composed of three lens groups as described above, it is preferable for the first-b lens group G12 to a cemented lens formed by cementing a negative lens L15 and a positive lens L16 together, in which a joint surface has a convex surface toward the object side; and to satisfy conditional expression (4) below. By configuring the first-b lens group G12 in such a manner, variations in aberrations accompanying focusing can be reduced. In particular, by orienting the joint surface toward this direction, variations in lateral chromatic aberration and astigmatism while focusing can be effectively suppressed. In addition, by satisfying conditional expression (4), secondary chromatic aberration can be effectively corrected. Note that by satisfying conditional expression (4-1) below, more favorable characteristics can be attained.

$$0.05 < \theta gF1bp - \theta gF1bn \tag{4}$$

$$0.10 < \theta gF1bp - \theta gF1bn \tag{4-1}$$

where,
θgF1bp: the partial dispersion ratio of the g-line and the F-line of the positive lens constituting the cemented lens of the first-b lens group,
θgF1bn: the partial dispersion ratio of the g-line and the F-line of the negative lens constituting the cemented lens of the first-b lens group.

It is preferable for the second-a lens group to be composed of a negative meniscus lens with a convex surface toward the object side and a negative lens having a biconcave shape. By configuring the lens in such a manner, spherical aberration can be effectively corrected.

In addition, it is preferable for the second-a lens group to satisfy conditional expression (5). By satisfying conditional expression (5), variations in off-axis aberration, particularly, distortion and astigmatism, while changing magnification can be suppressed. Note that by satisfying conditional expression (5-1) below, more favorable characteristics can be obtained.

$$1.75<N2a \tag{5}$$

$$1.79<N2a \tag{5-1}$$

where,
N2a: the average refractive index of the lenses constituting the second-a lens group.

It is preferable for the second-b lens group G22 to be composed of a positive lens L23 having a biconvex shape and a negative lens L24 in this order from the object side; and preferably satisfy conditional expression (6) below. By satisfying conditional expression (6), lateral chromatic aberration at the wide angle end can be effectively corrected. Note that by satisfying conditional expression (6-1), more favorable characteristics can be obtained.

$$20.0<v2bn-v2bp \tag{6}$$

$$30.0<v2bn-v2bp \tag{6-1}$$

where,
v2bn: the Abbe number of the negative lens constituting the cemented lens of the second-b lens group,
v2bp: the Abbe number of the positive lens constituting the cemented lens of the second-b lens group.

It is preferable for the third lens group G3 to be a cemented lens formed by cementing a negative lens L31 and a positive lens L32 together in this order from the object side; and to satisfy conditional expression (7) below. By satisfying conditional expression (7), lateral chromatic aberration at the wide angle end can be effectively corrected. Note that by satisfying conditional expression (7-1) below, more favorable characteristics can be obtained.

$$30.0<v3n-v3p \tag{7}$$

$$40.0<v3n-v3p \tag{7-1}$$

where,
v3n: the Abbe number of the negative lens constituting the cemented lens of the third lens group,
v3p: the Abbe number of the positive lens constituting the cemented lens of the third lens group.

It is preferable for the second lens group G2 to be positioned on the most-object side at the wide angle end and to be positioned at the most-image side at the telephoto end. By configuring the lens in such a manner, the amount of movement of the second lens group G2 can be large and variations in various aberrations such as spherical aberration, astigmatism, and the like while changing magnification can be reduced.

In the present zoom lens, as a material disposed on the most-object side, in particular, glass is preferably used, or a transparent ceramic may be employed.

Moreover, in the case that the present zoom lens is used in environments in which lenses are easily damaged, it is preferable for a multi-layer film coating for protection to be applied onto lenses. Moreover, in addition to a coating for protection, an antireflection coating may be applied onto lenses so as to reduce ghost light, and the like when using the lenses.

In the example of FIG. 1, the optical member PP is disposed between the lens system and the image surface Sim. Instead of disposing a low-pass filter, various kinds of filters which cut specific wavelength ranges, and the like between the lens system and the image surface Sim, these various kinds of filters may be disposed between lenses, or a coating, which exhibits the same effects as the various kinds of filters, may be applied onto the lens surfaces of any of the lenses.

Next, Numerical Examples of the zoom lens of the present invention will be described.

First, the zoom lens of Example 1 will be described. A collection of cross-sectional views of a zoom lens according to Example 1 illustrating the lens configuration thereof is shown in FIG. 1. Note that in FIG. 1, and FIGS. 2 through 4 respectively corresponding to Examples 2 through 4 to be described later, an optical member PP is also shown, and the left side is the object side and the right side is the image side. Further, the aperture stop St shown in the Figures does not necessarily represent the size or shape thereof, but represents the position thereof on the optical axis Z.

Basic lens data of the zoom lens of Example 1 is shown in Table 1, data related to specs is shown in Table 2, data related to the distances between surfaces which move is shown in Table 3, and data related to aspheric surface coefficients is shown in Table 4. The meanings of the symbols in the Tables will be described below with reference to Example 1 as an example. The same basically applies to Examples 2 through 4.

In the lens data of Table 1, the i-th (i=1, 2, 3, . . . ) surface number, the value of i sequentially increasing from the surface of the constituent element at the most object side, which is designated as 1, toward the image side are shown in the column Si. The radii of curvature of the i-th surface are shown in the column Ri, and the distances between i-th surfaces and (i+1)st surfaces along the optical axis Z are shown in the column Di. Further, the refractive indices of j-th (j=1, 2, 3, . . . ) optical elements with respect to the d-line (wavelength: 587.6 nm), the value of j sequentially increasing from the optical element at the most magnification side, which is designated as 1, toward the reduction side, are shown in the column Ndj. The Abbe numbers of j-th optical elements with respect to the d-line (wavelength: 587.6 nm) are shown in the column vdj. The partial dispersion ratios of j-th (j=1, 2, 3, . . . ) optical elements, the value of j sequentially increasing from the optical element at the most magnification side, which is designated as 1, toward the reduction side, are shown in the column of θgFj.

The partial dispersion ratio θgF is expressed by the formula below:

θgF=(Ng−NF)/(NF−NC) where,

Ng: the refractive index with respect to the g-line,
NF: the refractive index with respect to the F-line, and
NC: the refractive index with respect to the C-line.

Here, the sign of the radius of curvature is positive in the case that a surface shape is convex on the object side, and negative in the case that the surface shape is convex on the image side. Basic lens data also shows an aperture stop St and an optical member PP. The column of the surface number of a surface which corresponds to the aperture stop St shows a surface number together with the word "aperture stop". Moreover, in the lens data of Table 1, the column of each of the distances between surfaces that vary while changing magnification shows DD[i]. The value of the bottom column of Di is the distance between an image-side surface from the optical member PP and the image surface Sim.

Data related to specs at Table 2 shows the zoom ratio, the focal length f', the back focus Bf, the F-number FNo., and the full angle view 2ω of each of at the wide angle end, the intermediate, and the telephoto end.

In the basic lens data, data related to specs, and data related to the distances between surfaces which move, degrees are used as the unit of angles and mm is used as the unit of length, but other appropriate units may also be used, as optical systems are usable even when they are proportionally enlarged or miniaturized.

In the lens data of Table 1, the mark "*" is indicated at surface numbers of aspheric surfaces. Numerical values of paraxial radii of curvature are indicated as the radii of curvature of the aspheric surfaces. The data related to aspheric surface coefficients of Table 4 show surface numbers Si of aspheric surfaces, and aspheric surface coefficients with respect to these aspheric surfaces. The aspheric surface coefficients shows values of respective coefficients KA, Am (m=4, 6, 8, and 20).

$$Zd = C \cdot h^2 / \{1 + (1 - KA \cdot C^2 \cdot h^2)^{1/2}\} + \Sigma Am \cdot h^m \quad (B)$$

where,
Zd: the depth of an aspheric surface (the length of a perpendicular line drawn from a point on an aspheric surface with a height h to a plane perpendicular to the optical axis which contacts the peak of the aspheric surface)
h: height (the distance from the optical axis)
C: an inverse number of a paraxial radius of curvature
KA, Am: aspheric surface coefficients (m=4, 6, 8, 20)

TABLE 1

Example 1 Lens Data

| Si (Surface Numbers) | Ri (Radii of Cuvature) | Di (Distances Between Surfaces) | Ndi (Refractive Ratios) | ν dj (Abbe Numbers) | θ g, Fj (Partial Dispersion Ratios) |
|---|---|---|---|---|---|
| 1 | 83.00314 | 2.630 | 1.91082 | 35.25 | 0.58224 |
| 2 | 44.95021 | 16.530 | | | |
| 3 | 277.45898 | 2.230 | 1.77250 | 49.60 | 0.55212 |
| 4 | 100.01177 | 11.570 | | | |
| 5 | −127.84599 | 2.200 | 1.72916 | 54.68 | 0.54451 |
| 6 | 345.96386 | 0.300 | | | |
| 7 | 94.51150 | 9.870 | 1.59270 | 35.31 | 0.59336 |
| 8 | −765.68651 | DD[8] | | | |
| 9 | 110.38970 | 2.400 | 1.75211 | 25.05 | 0.61924 |
| 10 | 67.25700 | 13.330 | 1.43875 | 94.93 | 0.53433 |
| 11 | −224.69862 | DD[11] | | | |
| 12 | 81.45622 | 12.410 | 1.43875 | 94.93 | 0.53433 |
| 13 | −125.26542 | 0.480 | | | |
| *14 | 130.10227 | 4.650 | 1.69680 | 55.53 | 0.54341 |
| 15 | ∞ | DD[15] | | | |
| 16 | 45.78022 | 2.210 | 1.95375 | 32.32 | 0.59015 |
| 17 | 26.24569 | 7.080 | | | |
| *18 | −59.45977 | 1.400 | 1.69680 | 55.53 | 0.54341 |
| 19 | 47.04243 | DD[19] | | | |
| 20 | 52.58834 | 6.080 | 1.59270 | 35.31 | 0.59336 |
| 21 | −43.38300 | 1.100 | 1.59282 | 68.63 | 0.54414 |
| 22 | −153.23341 | DD[22] | | | |
| 23 | −32.31732 | 1.020 | 1.59282 | 68.63 | 0.54414 |
| 24 | 52.08200 | 3.480 | 1.84139 | 24.56 | 0.61274 |
| 25 | −297.11711 | DD[25] | | | |
| 26(Aperture Stop) | ∞ | 1.480 | | | |
| 27 | 190.62816 | 4.180 | 1.80518 | 25.42 | 0.61616 |
| 28 | −51.64800 | 1.150 | 1.80610 | 33.27 | 0.58845 |
| 29 | −94.36596 | 0.100 | | | |
| 30 | 39.45350 | 8.900 | 1.49700 | 81.54 | 0.53748 |
| 31 | −33.47500 | 1.080 | 1.95375 | 32.32 | 0.59015 |
| 32 | −483.16566 | 6.720 | | | |
| 33 | 85.84073 | 5.000 | 1.72000 | 46.02 | 0.56358 |
| 34 | −56.68479 | 2.530 | | | |
| 35 | 27.56264 | 6.778 | 1.65160 | 58.55 | 0.54267 |
| 36 | −185.71000 | 1.368 | 1.78472 | 25.68 | 0.61621 |
| 37 | 18.96982 | 1.700 | | | |
| 38 | 26.44447 | 7.900 | 1.49700 | 81.54 | 0.53748 |
| 39 | −21.61000 | 0.850 | 1.90366 | 31.32 | 0.59481 |
| 40 | 47.14894 | 8.930 | | | |
| 41 | 139.42743 | 2.450 | 1.48749 | 70.23 | 0.53007 |
| 42 | 46.74400 | 4.640 | 1.80809 | 22.76 | 0.63073 |
| 43 | −180.32086 | 24.477 | | | |
| 44 | ∞ | 2.300 | 1.51633 | 64.14 | 0.53531 |
| 45 | ∞ | 6.641 | | | |

TABLE 2

Example 1 Specs (the d-line)

| | Wide Angle End | Intermediate | Telephoto End |
|---|---|---|---|
| Zoom Ratios | 1.00 | 2.46 | 4.48 |
| f' | 19.680 | 48.414 | 88.168 |
| Bf' | 32.634 | 32.634 | 32.634 |
| FNo. | 2.75 | 2.75 | 2.75 |
| 2ω [°] | 80.6 | 35.4 | 20.0 |

TABLE 3

Example 1 Distances Associated With Zooming

| | | | |
|---|---|---|---|
| DD[8] | 6.870 | 6.870 | 6.870 |
| DD[11] | 10.590 | 10.590 | 10.590 |
| DD[15] | 1.000 | 37.957 | 53.793 |
| DD[19] | 4.170 | 4.710 | 1.538 |
| DD[22] | 41.550 | 6.856 | 4.267 |
| DD[25] | 13.840 | 11.037 | 0.963 |

TABLE 4

Example 1 Aspheric Surface Coefficients

| Surface Numbers | 14 | 18 |
|---|---|---|
| KA | 1.0000000E+00 | 1.0000000E+00 |
| A4 | −4.6433316E−07 | 1.1999956E−07 |
| A6 | −2.5587054E−11 | 3.3821300E−09 |
| A8 | −2.3840012E−13 | −3.0770237E−11 |
| A10 | 3.9268222E−16 | 4.0753795E−14 |
| A12 | −4.1717046E−19 | −4.6309009E−17 |
| A14 | 2.0614164E−22 | 2.0299350E−18 |
| A16 | 9.9062184E−26 | −2.6085742E−21 |
| A18 | −2.2581043E−28 | −3.4652574E−23 |
| A20 | 1.0137615E−31 | 8.4138419E−26 |

Aberration diagrams of the zoom lens of Example 1 are shown in A through L of FIG. 5. A through D of FIG. 5 respectively show spherical aberration, astigmatism, distortion, and lateral chromatic aberration at the wide angle end; E through H of FIG. 5 respectively show spherical aberration, astigmatism, distortion, and lateral chromatic aberration at the intermediate; and I through L of FIG. 5 respectively show spherical aberration, astigmatism, distortion, and lateral chromatic aberration at the telephoto end.

The aberration diagrams respectively showing spherical aberration, astigmatism, and distortion represents the d-line (a wavelength of 587.6 nm) as a reference wavelength. The spherical aberration diagram shows aberrations with respect to the d-line (a wavelength of 587.6 nm), the C-line (a wavelength of 656.3 nm), the F-line (a wavelength of 486.1 nm), and the g-line (a wavelength of 453.8 nm) respectively indicated by a solid line, a long broken line, a short broken line, and a dotted line. In the astigmatism diagrams, the solid line illustrates astigmatism in the sagittal direction while the broken line illustrates astigmatism in the tangential direction. In the lateral chromatic aberration diagram, aberrations with respect to the C-line (a wavelength of 656.3 nm), the F-line (a wavelength of 486.1 nm), and the g-line (a wavelength of 453.8 nm) are respectively indicated by a long broken line, a short broken line, and a dotted line. Note that in spherical aberration diagrams, Fno. refers to a F-number, and in the other aberration diagrams, ω refers to a half angle of view.

Figure 2:
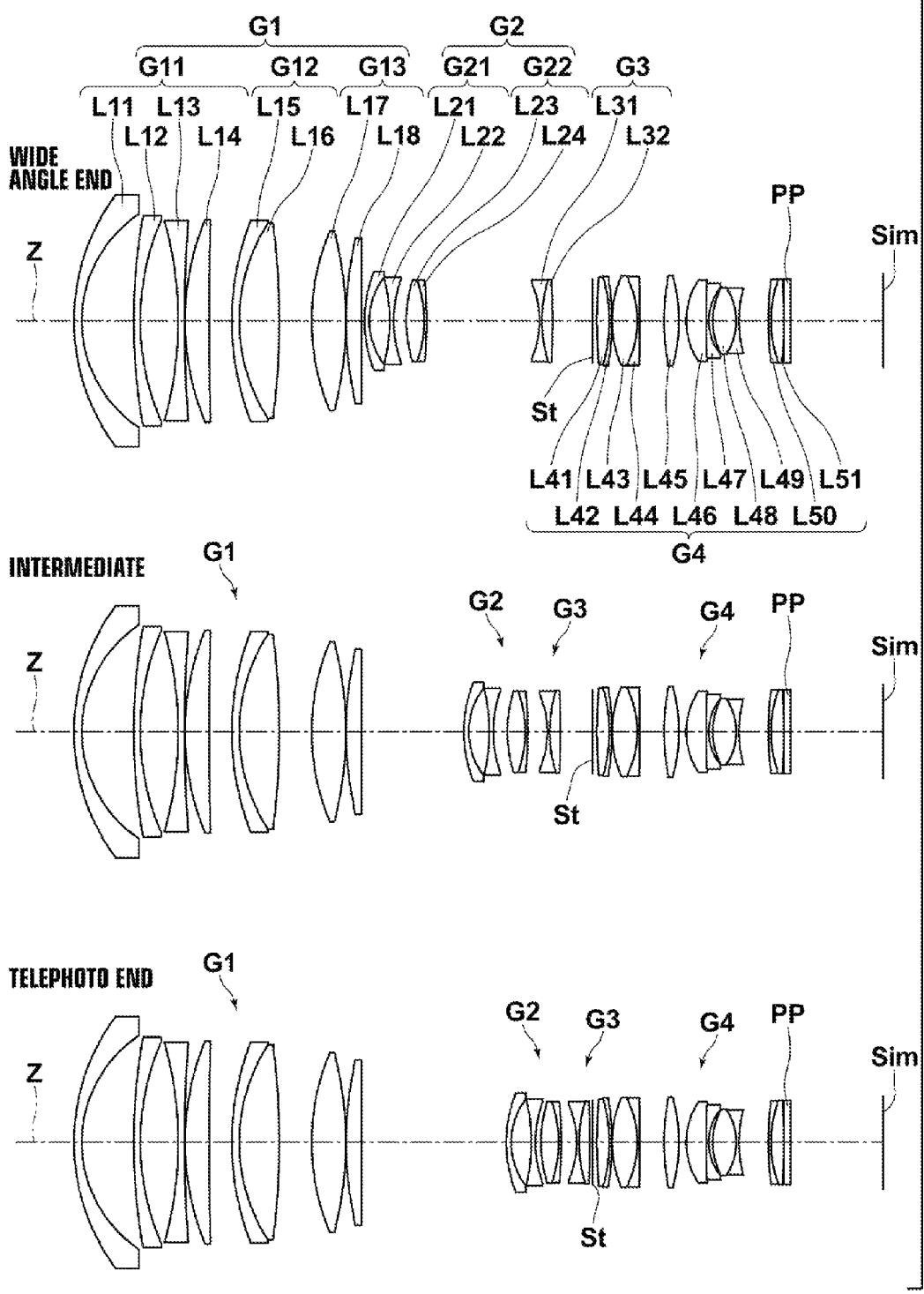
FIG. 2 is a collection of cross-sectional views of a zoom lens according to Example 2 of the present invention, illustrating the lens configuration thereof.

Next, a zoom lens of Example 2 will be described. FIG. 2 shows a collection of cross-sectional views of the zoom lens of Example 2, illustrating the lens configuration thereof. Moreover, basic lens data of the zoom lens of Example 2 are shown in Table 5, data related to specs thereof are shown in Table 6, data related to the distances between surfaces which move thereof are shown in Table 7, data related to aspheric surface coefficients are shown in Table 8, and the respective aberration diagrams are shown in A through L of FIG. 6.

TABLE 5

Example 2 Lens Data

| Si (Surface Numbers) | Ri (Radii of Cuvature) | Di (Distances Between Surfaces) | Ndi (Refractive Ratios) | ν dj (Abbe Numbers) | θ g, Fj (Partial Dispersion Ratios) |
|---|---|---|---|---|---|
| 1 | 73.14404 | 2.641 | 1.91082 | 35.25 | 0.58224 |
| 2 | 44.28621 | 17.661 | | | |
| 3 | 207.17521 | 2.196 | 1.78800 | 47.37 | 0.55598 |
| 4 | 87.70480 | 12.890 | | | |
| 5 | −127.85659 | 2.199 | 1.72916 | 54.68 | 0.54451 |
| 6 | 509.15509 | 0.100 | | | |
| 7 | 92.06599 | 8.268 | 1.59270 | 35.31 | 0.59336 |
| 8 | 1743.63369 | DD[8] | | | |
| 9 | 96.23060 | 2.520 | 1.80518 | 25.42 | 0.61616 |
| 10 | 62.51181 | 13.557 | 1.43875 | 94.93 | 0.53433 |
| 11 | −270.01316 | DD[11] | | | |
| 12 | 81.01040 | 11.510 | 1.43875 | 94.93 | 0.53433 |
| 13 | −125.60219 | 0.100 | | | |
| *14 | 115.36492 | 5.254 | 1.69680 | 55.53 | 0.54341 |
| 15 | −9154.32604 | DD[15] | | | |
| 16 | 45.33076 | 1.682 | 1.95375 | 32.32 | 0.59015 |
| 17 | 24.93281 | 6.872 | | | |
| *18 | −60.54305 | 1.401 | 1.69680 | 55.53 | 0.54341 |
| 19 | 41.77513 | DD[19] | | | |
| 20 | 47.87388 | 6.032 | 1.59270 | 35.31 | 0.59336 |
| 21 | −41.72514 | 0.800 | 1.59282 | 68.63 | 0.54414 |
| 22 | −161.01035 | DD[22] | | | |
| 23 | −32.72974 | 0.809 | 1.59282 | 68.63 | 0.54414 |
| 24 | 47.69571 | 3.587 | 1.84139 | 24.56 | 0.61274 |
| 25 | −364.58786 | DD[25] | | | |
| 26(Aperture Stop) | ∞ | 1.501 | | | |
| 27 | 170.42461 | 4.265 | 1.80518 | 25.42 | 0.61616 |
| 28 | −53.11421 | 0.801 | 1.80100 | 34.97 | 0.58642 |
| 29 | −94.69441 | 0.099 | | | |
| 30 | 38.54465 | 8.584 | 1.49700 | 81.54 | 0.53748 |
| 31 | −34.17764 | 0.799 | 1.95375 | 32.32 | 0.59015 |
| 32 | −942.34142 | 8.246 | | | |
| 33 | 78.40824 | 5.094 | 1.69680 | 55.53 | 0.54341 |
| 34 | −56.84731 | 2.438 | | | |
| 35 | 25.23574 | 6.788 | 1.61800 | 63.33 | 0.54414 |
| 36 | 287.77039 | 0.874 | 1.78472 | 25.68 | 0.61621 |
| 37 | 18.12597 | 1.426 | | | |

TABLE 5-continued

Example 2 Lens Data

| Si (Surface Numbers) | Ri (Radii of Cuvature) | Di (Distances Between Surfaces) | Ndi (Refractive Ratios) | ν dj (Abbe Numbers) | θ g, Fj (Partial Dispersion Ratios) |
|---|---|---|---|---|---|
| 38 | 25.40391 | 7.898 | 1.49700 | 81.54 | 0.53748 |
| 39 | −21.10362 | 0.989 | 1.90366 | 31.32 | 0.59481 |
| 40 | 45.61142 | 9.973 | | | |
| 41 | 118.77014 | 0.810 | 1.51742 | 52.43 | 0.55649 |
| 42 | 41.00971 | 4.400 | 1.80809 | 22.76 | 0.63073 |
| 43 | −217.93608 | 0.000 | | | |
| 44 | ∞ | 2.300 | 1.51633 | 64.14 | 0.53531 |
| 45 | ∞ | 31.407 | | | |

TABLE 6

Example 2 Specs (the d-line)

| | Wide Angle End | Intermediate | Telephoto End |
|---|---|---|---|
| Zoom Ratios | 1.00 | 2.46 | 4.48 |
| f | 19.679 | 48.410 | 88.162 |
| Bf | 32.923 | 32.923 | 32.923 |
| FNo. | 2.76 | 2.76 | 2.76 |
| 2ω [°] | 80.6 | 35.6 | 20.0 |

TABLE 7

Example 2 Distances Associated With Zooming

| DD[8] | 7.654 | 7.654 | 7.654 |
|---|---|---|---|
| DD[11] | 11.053 | 11.053 | 11.053 |
| DD[15] | 1.000 | 34.752 | 49.067 |
| DD[19] | 4.292 | 4.771 | 1.843 |
| DD[22] | 38.309 | 6.716 | 5.276 |
| DD[25] | 13.548 | 10.910 | 0.962 |

TABLE 8

Example 2 Aspheric Surface Coefficients

| Surface Numbers | 14 | 18 |
|---|---|---|
| KA | 1.0000000E+00 | 1.0000000E+00 |
| A4 | −5.0911164E−07 | 3.4125737E−07 |
| A6 | −3.1250591E−11 | −5.2641281E−10 |
| A8 | −2.1164207E−13 | −9.9442940E−12 |
| A10 | 3.6773035E−16 | 2.4276373E−14 |
| A12 | −4.3171039E−19 | 1.0704031E−18 |
| A14 | 2.2752172E−22 | −9.6680127E−22 |
| A16 | 8.1751422E−26 | 5.0291657E−24 |
| A18 | −1.8946357E−28 | −6.2378344E−25 |
| A20 | 8.2410517E−32 | −2.5476710E−28 |

Figure 3:
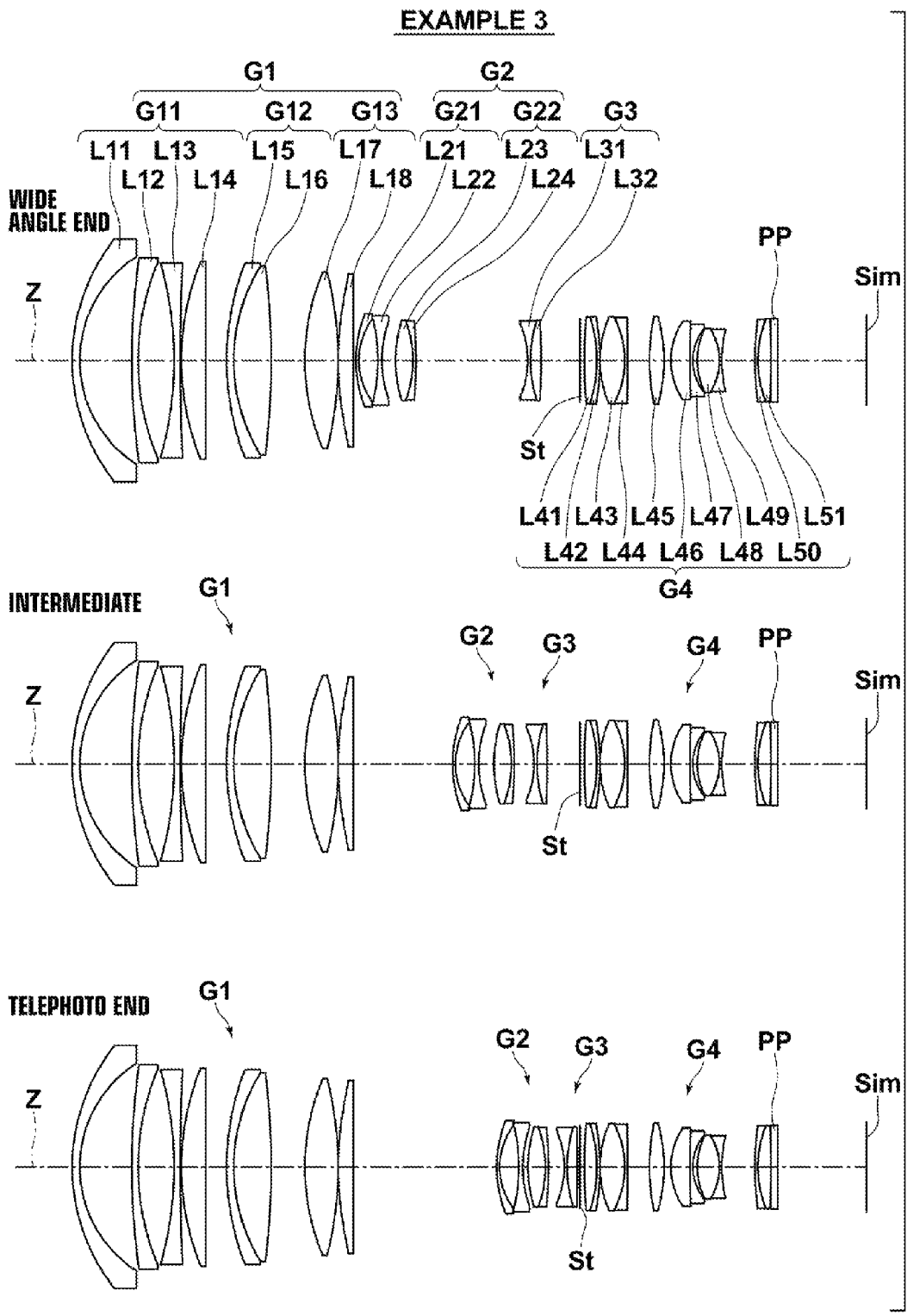
FIG. 3 is a collection of cross-sectional views of a zoom lens according to Example 3 of the present invention, illustrating the lens configuration thereof.

Next, a zoom lens of Example 3 will be described. FIG. 3 shows a collection of cross-sectional views of the zoom lens of Example 3, illustrating the lens configuration thereof. Moreover, basic lens data of the zoom lens of Example 3 are shown in Table 9, data related to specs thereof are shown in Table 10, data related to the distances between surfaces which move thereof are shown in Table 11, data related to aspheric surface coefficients are shown in Table 12, and the respective aberration diagrams are shown in A through L of FIG. 7.

TABLE 9

Example 3 Lens Data

| Si (Surface Numbers) | Ri (Radii of Cuvature) | Di (Distances Between Surfaces) | Ndi (Refractive Ratios) | ν dj (Abbe Numbers) | θ g, Fj (Partial Dispersion Ratios) |
|---|---|---|---|---|---|
| 1 | 70.42845 | 2.640 | 1.90069 | 37.12 | 0.57587 |
| 2 | 44.21592 | 18.407 | | | |
| 3 | 270.58308 | 2.201 | 1.81600 | 46.62 | 0.55682 |
| 4 | 91.32390 | 12.693 | | | |
| 5 | −127.93917 | 2.201 | 1.72916 | 54.68 | 0.54451 |
| 6 | 773.32987 | 0.361 | | | |
| 7 | 94.64643 | 8.655 | 1.59270 | 35.31 | 0.59336 |
| 8 | −7549.68172 | DD[8] | | | |
| 9 | 96.24643 | 2.521 | 1.84661 | 23.78 | 0.62072 |
| 10 | 64.76809 | 13.202 | 1.43875 | 94.93 | 0.53433 |
| 11 | −275.62377 | DD[11] | | | |
| 12 | 81.42407 | 11.708 | 1.43875 | 94.93 | 0.53433 |
| 13 | −131.28419 | 0.099 | | | |
| *14 | 116.39370 | 5.232 | 1.69680 | 55.53 | 0.54341 |
| 15 | 19220.35941 | DD[15] | | | |
| 16 | 45.71724 | 0.999 | 1.95375 | 32.32 | 0.59015 |
| 17 | 25.00770 | 6.759 | | | |
| *18 | −61.98225 | 1.401 | 1.69680 | 55.53 | 0.54341 |
| 19 | 41.88186 | DD[19] | | | |
| 20 | 48.69937 | 6.109 | 1.59270 | 35.31 | 0.59336 |
| 21 | −41.01735 | 0.999 | 1.59282 | 68.63 | 0.54414 |
| 22 | −165.32917 | DD[22] | | | |
| 23 | −32.97429 | 1.010 | 1.59282 | 68.63 | 0.54414 |
| 24 | 47.16079 | 3.625 | 1.84139 | 24.56 | 0.61274 |
| 25 | −376.47846 | DD[25] | | | |
| 26(Aperture Stop) | ∞ | 1.501 | | | |
| 27 | 172.56201 | 4.414 | 1.80518 | 25.42 | 0.61616 |
| 28 | −50.31455 | 0.999 | 1.80610 | 33.27 | 0.58845 |
| 29 | −94.36069 | 0.099 | | | |
| 30 | 38.70266 | 8.702 | 1.49700 | 81.54 | 0.53748 |
| 31 | −34.20457 | 1.000 | 1.95375 | 32.32 | 0.59015 |
| 32 | −967.01479 | 7.775 | | | |
| 33 | 79.10822 | 5.120 | 1.69680 | 55.53 | 0.54341 |
| 34 | −57.04672 | 2.436 | | | |
| 35 | 25.39763 | 6.738 | 1.61800 | 63.33 | 0.54414 |
| 36 | 291.55391 | 0.999 | 1.78472 | 25.68 | 0.61621 |
| 37 | 18.18690 | 1.569 | | | |
| 38 | 25.68995 | 7.817 | 1.49700 | 81.54 | 0.53748 |
| 39 | −21.35367 | 0.801 | 1.90366 | 31.32 | 0.59481 |
| 40 | 45.37060 | 11.770 | | | |
| 41 | 124.03432 | 1.010 | 1.51742 | 52.43 | 0.55649 |
| 42 | 40.85972 | 4.610 | 1.80809 | 22.76 | 0.63073 |
| 43 | −217.15252 | 0.000 | | | |
| 44 | ∞ | 2.300 | 1.51633 | 64.14 | 0.53531 |
| 45 | ∞ | 31.382 | | | |

TABLE 10

Example 3 Specs (the d-line)

| | Wide Angle End | Intermediate | Telephoto End |
|---|---|---|---|
| Zoom Ratios | 1.00 | 2.46 | 4.75 |
| f' | 19.679 | 48.409 | 93.473 |
| Bf' | 32.898 | 32.898 | 32.898 |
| FNo. | 2.76 | 2.76 | 2.82 |
| 2ω [°] | 80.6 | 35.6 | 19.0 |

TABLE 11

Example 3 Distances Associated With Zooming

| | | | |
|---|---|---|---|
| DD[8] | 7.331 | 7.331 | 7.331 |
| DD[11] | 11.851 | 11.851 | 11.851 |
| DD[15] | 1.000 | 35.079 | 50.613 |
| DD[19] | 4.845 | 5.362 | 1.874 |
| DD[22] | 39.397 | 7.035 | 5.636 |
| DD[25] | 13.841 | 11.607 | 0.960 |

TABLE 12

Example 3 Aspheric Surface Coefficients

| Surface Numbers | 14 | 18 |
|---|---|---|
| KA | 1.0000000E+00 | 1.0000000E+00 |
| A4 | −5.0886396E−07 | 3.2212112E−07 |
| A6 | −2.9992399E−11 | −3.5319415E−10 |
| A8 | −2.1113585E−13 | −9.7163490E−12 |
| A10 | 3.6664238E−16 | 2.0012598E−14 |
| A12 | −4.3275426E−19 | 2.9377052E−18 |
| A14 | 2.2824481E−22 | 8.6145641E−22 |
| A16 | 8.9053390E−26 | 1.7327668E−24 |
| A18 | −1.9637533E−28 | −4.8283515E−25 |
| A20 | 8.2214654E−32 | 2.0025182E−29 |

Figure 4:
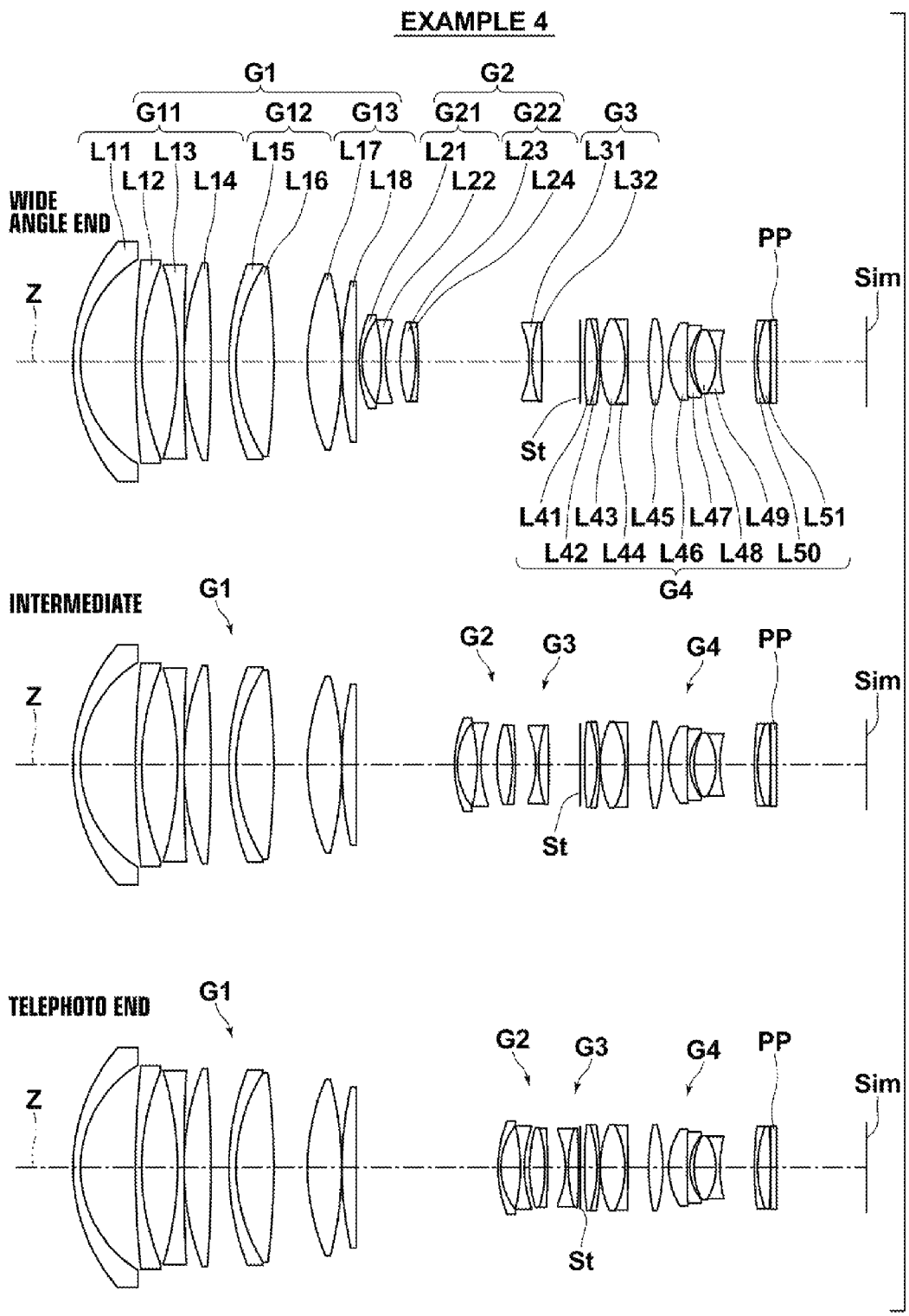
FIG. 4 is a collection of cross-sectional views of a zoom lens according to Example 4 of the present invention, illustrating the lens configuration thereof.

Next, a zoom lens of Example 4 will be described. FIG. 4 shows a collection of cross-sectional views of the zoom lens of Example 4, illustrating the lens configuration thereof. Moreover, basic lens data of the zoom lens of Example 4 are shown in Table 13, data related to specs thereof are shown in Table 14, data related to the distances between surfaces which move thereof are shown in Table 15, data related to aspheric surface coefficients are shown in Table 16, and the respective aberration diagrams are shown in A through L of FIG. 8.

TABLE 13

Example 4 Lens Data

| Si (Surface Numbers) | Ri (Radii of Cuvature) | Di (Distances Between Surfaces) | Ndi (Refractive Ratios) | ν dj (Abbe Numbers) | θ g, Fj (Partial Dispersion Ratios) |
|---|---|---|---|---|---|
| 1 | 66.57372 | 2.641 | 1.91082 | 35.25 | 0.58224 |
| 2 | 43.54648 | 19.614 | | | |
| 3 | 344.74224 | 2.200 | 1.83481 | 42.73 | 0.56486 |
| 4 | 92.78680 | 12.826 | | | |
| 5 | −120.15905 | 2.199 | 1.72916 | 54.68 | 0.54451 |
| 6 | 635.74541 | 0.101 | | | |
| 7 | 100.68133 | 9.678 | 1.59270 | 35.31 | 0.59336 |
| 8 | −476.34620 | DD[8] | | | |
| 9 | 98.10224 | 2.521 | 1.84661 | 23.78 | 0.62072 |
| 10 | 65.45699 | 13.406 | 1.43875 | 94.93 | 0.53433 |
| 11 | −280.92211 | DD[11] | | | |
| 12 | 80.85993 | 12.123 | 1.43875 | 94.93 | 0.53433 |
| 13 | −127.20725 | 0.099 | | | |
| *14 | 120.00733 | 5.201 | 1.69680 | 55.53 | 0.54341 |
| 15 | −21474.83648 | DD[15] | | | |
| 16 | 45.61479 | 1.000 | 1.90069 | 37.12 | 0.57587 |
| 17 | 24.85308 | 6.933 | | | |
| *18 | −64.12310 | 1.399 | 1.69680 | 55.53 | 0.54341 |
| 19 | 42.60635 | DD[19] | | | |
| 20 | 49.31537 | 5.478 | 1.59270 | 35.31 | 0.59336 |
| 21 | −53.05793 | 1.001 | 1.59282 | 68.63 | 0.54414 |
| 22 | −208.53074 | DD[22] | | | |
| 23 | −32.48983 | 1.010 | 1.59282 | 68.63 | 0.54414 |
| 24 | 47.16346 | 3.578 | 1.84139 | 24.56 | 0.61274 |
| 25 | −407.52370 | DD[25] | | | |
| 26(Aperture Stop) | ∞ | 1.500 | | | |
| 27 | 173.28074 | 4.479 | 1.80518 | 25.42 | 0.61616 |
| 28 | −49.35520 | 1.001 | 1.80440 | 39.59 | 0.57297 |
| 29 | −95.48095 | 0.099 | | | |
| 30 | 38.35772 | 8.874 | 1.49700 | 81.54 | 0.53748 |
| 31 | −34.30700 | 0.999 | 1.95375 | 32.32 | 0.59015 |
| 32 | −895.86006 | 7.445 | | | |
| 33 | 79.05254 | 5.042 | 1.69680 | 55.53 | 0.54341 |
| 34 | −56.95364 | 2.137 | | | |
| 35 | 26.19394 | 6.602 | 1.64000 | 60.08 | 0.53704 |
| 36 | 690.29193 | 0.875 | 1.78472 | 25.68 | 0.61621 |
| 37 | 18.34741 | 1.490 | | | |
| 38 | 25.13554 | 7.839 | 1.49700 | 81.54 | 0.53748 |
| 39 | −21.91479 | 1.429 | 1.90366 | 31.32 | 0.59481 |
| 40 | 45.71797 | 12.240 | | | |
| 41 | 120.09243 | 1.177 | 1.51742 | 52.43 | 0.55649 |

TABLE 13-continued

Example 4 Lens Data

| Si (Surface Numbers) | Ri (Radii of Cuvature) | Di (Distances Between Surfaces) | Ndi (Refractive Ratios) | ν dj (Abbe Numbers) | θ g, Fj (Partial Dispersion Ratios) |
|---|---|---|---|---|---|
| 42 | 42.60230 | 4.547 | 1.80809 | 22.76 | 0.63073 |
| 43 | −219.99061 | 0.000 | | | |
| 44 | ∞ | 2.300 | 1.51633 | 64.14 | 0.53531 |
| 45 | ∞ | 31.942 | | | |

TABLE 14

Example 4 Specs (the d-line)

| | Wide Angle End | Intermediate | Telephoto End |
|---|---|---|---|
| Zoom Ratios | 1.00 | 2.46 | 4.75 |
| f | 19.699 | 48.459 | 93.568 |
| Bf | 33.458 | 33.458 | 33.458 |
| FNo. | 2.76 | 2.76 | 2.82 |
| 2ω [°] | 80.4 | 35.4 | 18.8 |

TABLE 15

Example 4 Distances Associated With Zooming

| DD[8] | 6.374 | 6.374 | 6.374 |
|---|---|---|---|
| DD[11] | 12.070 | 12.070 | 12.070 |
| DD[15] | 1.000 | 35.056 | 50.472 |
| DD[19] | 5.316 | 5.684 | 1.867 |
| DD[22] | 39.438 | 7.350 | 6.304 |
| DD[25] | 13.636 | 11.300 | 0.747 |

TABLE 16

Example 4 Aspheric Surface Coefficients

| Surface Numbers | 14 | 18 |
|---|---|---|
| KA | 1.0000000E+00 | 1.0000000E+00 |
| A4 | −5.0851573E−07 | 3.3589511E−07 |
| A6 | −2.9976274E−11 | −3.5641463E−10 |
| A8 | −2.1102126E−13 | −1.0751494E−11 |
| A10 | 3.6685031E−16 | 2.4301463E−14 |
| A12 | −4.3261243E−19 | 2.7801592E−18 |
| A14 | 2.2817692E−22 | 8.9989316E−22 |
| A16 | 8.9349330E−26 | 1.7019325E−24 |
| A18 | −1.9642970E−28 | −8.2803400E−25 |
| A20 | 8.2144630E−32 | −2.8038603E−29 |

Values corresponding to conditional expressions (1) through (7) are shown in Table 17 for each of the zoom lenses of Examples 1 through 4. Note that the d-line is the reference wavelength in all the Examples, and the values shown in Table 17 are based on this reference wavelength.

TABLE 17

| Expression Numbers | Conditional Expressions | Example 1 | Example 2 | Example 3 | Example 4 |
|---|---|---|---|---|---|
| (1) | N1a1 | 1.911 | 1.911 | 1.901 | 1.911 |
| (2) | f1a1/f1 | −1.811 | −2.229 | −2.366 | −2.514 |
| (3) | fw/f1b | 0.081 | 0.081 | 0.081 | 0.078 |
| (4) | θ gF1bp−θ gF1bn | 0.122 | 0.123 | 0.129 | 0.129 |
| (5) | N2a | 1.825 | 1.825 | 1.825 | 1.799 |
| (6) | ν 2bn-ν 2bp | 33.32 | 33.32 | 33.32 | 33.32 |
| (7) | ν 3n-ν 3p | 44.07 | 44.07 | 44.07 | 44.07 |

It can be understood from the data shown above that all of the zoom lenses of Examples 1 through 4 satisfy conditional expressions (1) through (7) and are those having high performance, in which various aberrations are favorably corrected.

Figure 9:
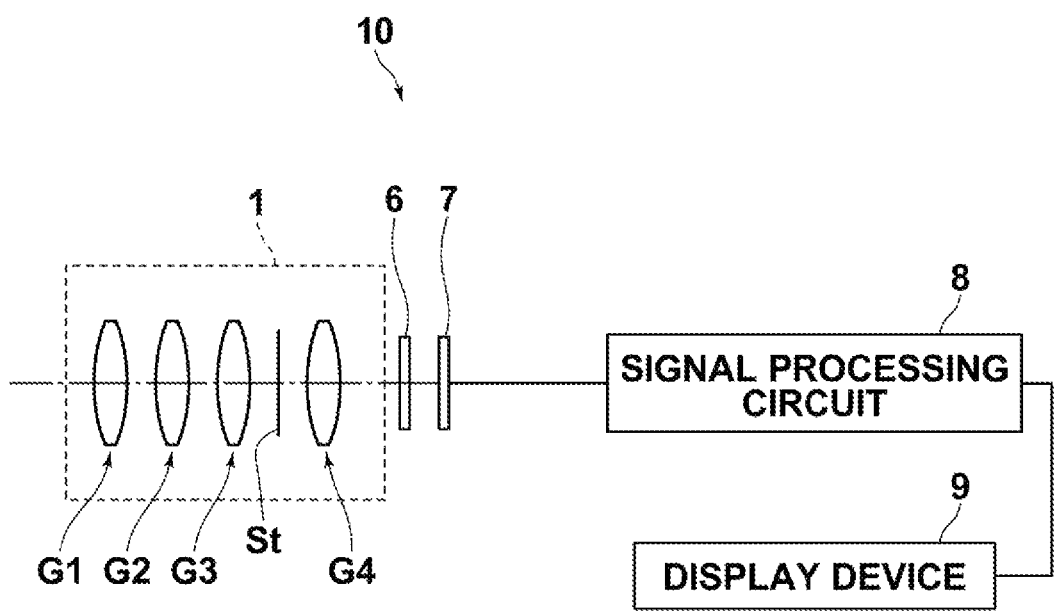
FIG. 9 is a schematic configuration diagram of an imaging apparatus according to an embodiment of the present invention.

Next, an imaging apparatus according to an embodiment of the present invention will be described. FIG. 9 shows a schematic configuration of the imaging apparatus including the zoom lens of the embodiment of the present invention as an example of the imaging apparatus of the embodiment of the present invention. Note that FIG. 9 schematically illustrates each of the lens groups. Examples of this imaging apparatus include a video camera or an electronic still camera, and the like, in which a solid state imaging element such as a CCD, a CMOS, and the like is applied as a recording medium.

The imaging apparatus 10 shown in FIG. 9 includes an imaging lens 1; a filter 6, which is disposed on the image side of the imaging lens 1 and which has a function of a low-pass filter or the like; an imaging element 7 disposed on the image side of the filter 6; and a signal processing circuit 8. The imaging element 7 converts an optical image formed by the imaging lens 1 into an electric signal. A CCD (Charge Coupled Device), a CMOS (Complementary Metal Oxide Semiconductor), or the like may be employed as the imaging element 7, for example. The imaging element 7 is disposed such that the imaging surface thereof matches the image surface of the imaging lens 1.

An image photographed by the imaging lens 1 is formed on the imaging surface of the imaging element 7, and an output signal regarding the image from the imaging element is subjected to an arithmetic processing by the signal processing circuit 8 so that an image is displayed on the display device 9.

The present invention has been described with reference to the embodiments and Examples. The zoom lens of the present invention is not limited to the Examples described above, and various modifications are possible. For example, values, such as the radius of curvature of each lens, the distances between surfaces, the refractive indices, and the Abbe numbers are not limited to the values shown in the Numerical Examples above, but may be other values.

What is claimed is:

1. A zoom lens substantially consisting of a first lens group having positive refractive power, which is fixed while changing magnification; a second lens group having negative refractive power, which moves from the object side to the image side while changing magnification from the wide angle end to the telephoto end; a third lens group having negative refractive power, which corrects movement of an image surface while changing magnification; and a fourth lens group, which is fixed while changing magnification, having positive refractive power and an aperture stop in this order from the object side, wherein the first lens group includes a negative meniscus lens on the most-object side;

the second lens group is composed of a second-a lens group having negative refractive power and at least one aspheric surface and a second-b lens group having positive refractive power in this order from the object side, and the distance between the second-a lens group and the second-b lens group is changed while changing magnification; and the third lens group moves such that the distance between the third lens group and the fourth lens group becomes narrower at the telephoto end than at the wide angle end; and conditional expression (1) below is satisfied:

$$1.89 < N1a1 \qquad (1),$$ where

N1a1: the refractive index of a negative meniscus lens on the most-object side in the first lens group.

2. The zoom lens of claim 1 satisfies conditional expression (2) below:

$$-3.00<f1a1/f1<-1.70 \quad (2),\text{ where}$$

f1a1: the focal length of the negative meniscus lens on the most-object side in the first lens group, f1: the focal length of the first lens group.

3. The zoom lens of claim 1, wherein the first lens group substantially consists of a first-a lens group having negative refractive power, which is fixed while focusing; a first-b lens group having positive refractive power, which moves while focusing; and a first-c lens group having positive refractive power, which is fixed while focusing, in this order from the object side, and satisfies conditional expression (3) below:

$$0.05<fw/f1b<0.20 \quad (3),\text{ where}$$

fw: the focal length of the entire system at the wide angle end, f1b: the focal length of the first-b lens group.

4. The zoom lens of claim 3, wherein the first-b lens group is a cemented lens formed by cementing a negative lens and a positive lens together, in which a joint surface has a convex surface toward the object side, and satisfies conditional expression (4) below:

$$0.05<\theta gF1bp-\theta gF1bn \quad (4),\text{ where}$$

θgF1bp: the partial dispersion ratio of the g-line and the F-line of the positive lens constituting the cemented lens of the first-b lens group, θgF1bn: the partial dispersion ratio of the g-line and the F-line of the negative lens constituting the cemented lens of the first-b lens group.

5. The zoom lens of claim 1, wherein the second-a lens group substantially consists of a negative meniscus lens with a convex surface toward the object side and a negative lens having a biconcave shape.

6. The zoom lens of claim 1, wherein conditional expression (5) below is satisfied:

$$1.75<N2a \quad (5),\text{ where}$$

N2a: the average refractive index of lenses constituting the second-a lens group.

7. The zoom lens of claim 1, wherein the second-b lens group is a cemented lens formed by cementing a positive lens having a biconvex shape and a negative lens together, in this order from the object side, and satisfies conditional expression (6) below:

$$20.0<v2bn-v2bp \quad (6),\text{ where}$$

v2bn: the Abbe number of the negative lens constituting the cemented lens of the second-b lens group, v2bp: the Abbe number of the positive lens constituting the cemented lens of the second-b lens group.

8. The zoom lens of claim 1, wherein the third lens group is a cemented lens formed by cementing a negative lens and a positive lens together, in this order from the object side, and satisfies conditional expression (7) below:

$$30.0<v3n-v3p \quad (7),\text{ where}$$

v3n: the Abbe number of the negative lens constituting the cemented lens of the third lens group, v3p: the Abbe number of the positive lens constituting the cemented lens of the third lens group.

9. The zoom lens of claim 1, wherein the second lens group is positioned at the most-object side at the wide angle end, and is positioned at the most-image side at the telephoto end.

10. The zoom lens of claim 1, wherein conditional expression (1-1) below is satisfied:

$$1.90<N1a1 \quad (1\text{-}1).$$

11. The zoom lens of claim 1, wherein conditional expression (2-1) is satisfied:

$$-2.80<f1a1/f1<-1.75 \quad (2\text{-}1),\text{ where}$$

f1a1: the focal length of the negative meniscus lens on the most-object side in the first lens group, f1: the focal length of the first lens group.

12. The zoom lens of claim 1, wherein the first lens group substantially consists of a first-a lens group having negative refractive power, which is fixed while focusing; a first-b lens group having positive refractive power, which moves while focusing; and a first-c lens group having positive refractive power, which is fixed while focusing, in this order from the object side, and satisfies conditional expression (3-1) below:

$$0.07<fw/f1b<0.10 \quad (3\text{-}1),\text{ where}$$

fw: the focal length of the entire system at the wide angle end, f1b: the focal length of the first-b lens group.

13. The zoom lens of claim 3, wherein the first-b lens group is a cemented lens formed by cementing a negative lens and a positive lens together, in which a joint surface has a convex surface toward the object side, and satisfies conditional expression (4-1) below:

$$0.10<\theta gF1bp-\theta gF1bn \quad (4\text{-}1),\text{ where}$$

θgF1bp: the partial dispersion ratio of the g-line and the F-line of the positive lens constituting the cemented lens of the first-b lens group, θgF1bn: the partial dispersion ratio of the g-line and the F-line of the negative lens constituting the cemented lens of the first-b lens group.

14. The zoom lens of claim 1, wherein conditional expression (5-1) below is satisfied:

$$1.79<N2a \quad (5\text{-}1),\text{ where}$$

N2a: the average refractive index of lenses constituting the second-a lens group.

15. The zoom lens of claim 1, wherein the second-b lens group is a cemented lens formed by cementing a positive lens having a biconvex shape and a negative lens together, in this order from the object side; and to satisfy conditional expression (6-1) below:

$$30.0<v2bn-v2bp \quad (6\text{-}1),\text{ where}$$

v2bn: the Abbe number of the negative lens constituting the cemented lens of the second-b lens group, v2bp: the Abbe number of the positive lens constituting the cemented lens of the second-b lens group.

16. The zoom lens of claim 1, wherein the third lens group is a cemented lens formed by cementing a negative lens and a positive lens together, in this order from the object side, and satisfies conditional expression (7-1) below:

$$40.0<v3n-v3p \quad (7\text{-}1),\text{ where}$$

v3n: the Abbe number of the negative lens constituting the cemented lens of the third lens group, v3p: the Abbe number of the positive lens constituting the cemented lens of the third lens group.

17. An imaging apparatus comprising the zoom lens of claim 1.

* * * * *